March 29, 1927.
G. E. NIX
CULTIVATOR FENDER
Filed Sept. 23, 1925
1,622,665
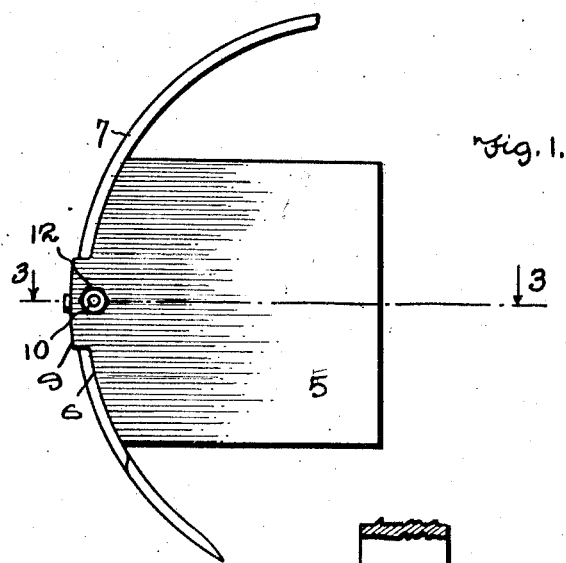
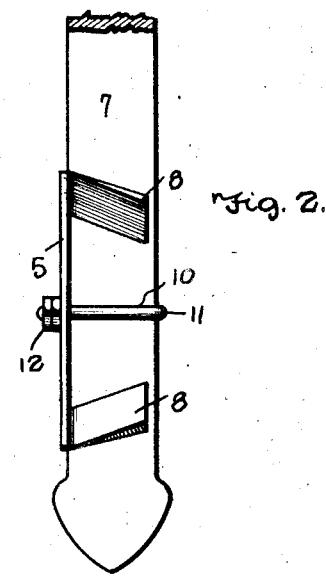
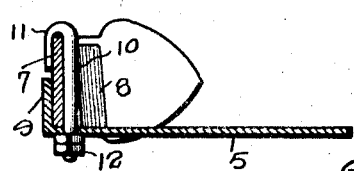
George E. Nix, Inventor
Witnesses
By Richard B. Owen
Attorney Patented Mar. 29, 1927.

1,622,665

UNITED STATES PATENT OFFICE.

GEORGE E. NIX, OF PHIL CAMPBELL, ALABAMA.

CULTIVATOR FENDER.

Application filed September 23, 1925. Serial No. 58,183.

This invention relates to certain new and useful improvements in cultivator shields and has more particular reference to an improved shield adapted to be attached to a cultivator tooth or the like so as to prevent the dirt from being thrown over onto young plants whereby the latter will not be covered and destroyed.

A specific object of this invention is to provide a shield of the above kind particularly adapted for attachment to the curved spring teeth employed upon certain types of cultivators.

Still another object of the invention is to provide a cultivator shield of the above kind with simple and effective means for attaching the same to a cultivator tooth whereby the shield may be adjusted vertically to suit the requirements in accordance with the size of plant to be protected.

With the above general objects in view and others that will become apparent as the nature of the invention is better understood, the same consists in the novel form, combination and arrangement of parts, hereinafter more fully described shown in the accompanying drawing and claimed.

In the drawing wherein like reference characters indicate corresponding parts throughout the several views.

Figure 1 is a fragmentary side elevational view showing a portion of a spring cultivator tooth having a cultivator shield constructed in accordance with the present invention mounted thereon.

Figure 2 is a front elevational view of the device shown in Figure 1.

Figure 3 is a horizontal section taken upon line 3—3 of Figure 1.

Referring more in detail to the drawing, the present invention embodies a shield composed of a flat plate 5, having an arcuate rear edge as at 6 conforming to the shape of the spring cultivator tooth 7. Formed integral with the plate at its rear curved edge are a pair of spaced laterally extending rigid tongues 8 adapted to extend transversely across and engage the forward surface of the tooth 7 at spaced points, and also extending laterally from the curved edge of the plate 5 is a further tongue 9 disposed intermediate the tongues 8 and positioned to flatly engage the rear surface of the tooth 7 whereby the plate 5 is slidably engaged with the tooth 7 and capable of adjustment thereon in a general vertical direction. The plate 5 is formed with an opening adjacent the tongue 9 through which is slidably disposed the shank of a bolt 10 whose outer end terminates in a hook 11 engaging over the remote edge of the tooth 7. The other end of the bolt 10 has nuts 12 threaded thereon in engagement with the outer surface of the plate 5, so that when the nuts are threaded on to the bolt the hook 11 will be drawn tightly into engagement with the tooth 7 for rigidly and firmly securing the plate 5 in the desired position on the tooth 7. Obviously, by loosening the nuts 12 the shield may be adjusted relative to the tooth 7 either upwardly or downwardly as conditions may dictate and upon removal of the nuts 12 the bolt 10 may be moved from the plate 5 so as to permit complete detachment of the latter from the tooth if desired. When the plants to be protected are comparatively tall, the plate 5 will be adjusted upwardly, and when the plants are quite young and of comparatively small size the plate 5 will be adjusted downwardly close to the ground. In any event the dirt or soil is thrown upwardly against the inner surface of the plate 5 and thereby prevented from passing outwardly laterally onto the plants so that the latter will not be covered or destroyed.

From the foregoing description it is believed that the construction and operation of the present invention will be readily understood and appreciated by those skilled in the art.

Minor changes may be made without departing from the scope of the invention as claimed.

What I claim is new is:

1. A cultivator shield comprising a plate having means at its rear vertical edge for slidably associating the same with a cultivator tooth, and means engageable with the cultivator tooth for releasably securing the plate in any desired position relative to the tooth, the means for slidably associating the plate with the tooth comprising lateral tongues rigid with the plate and engageable with the forward and rear surfaces of the said tooth, and the means for securing the plate in adjusted position embodying a bolt slidable through the plate and having a hook on one end engageable with the cultivator tooth, said bolt having nuts threaded thereon and engageable with the outer side of the plate.

2. A cultivator shield comprising a plate, laterally directed tongues carried by one end of said plate and engageable with the front and rear surfaces of a cultivator tooth for slidably associating said plate therewith, and a bolt carried by said plate and engageable with said tooth for releasably securing the plate in any desired vertically adjusted position relative to said tooth.

In testimony whereof I affix my signature.

GEORGE E. NIX.